Oct. 20, 1931.  K. E. PEILER  1,828,718
CONICAL STIRRER
Filed April 26, 1928
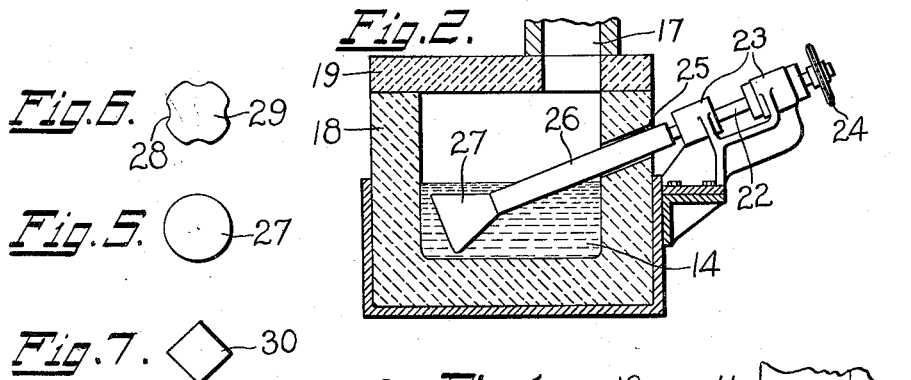
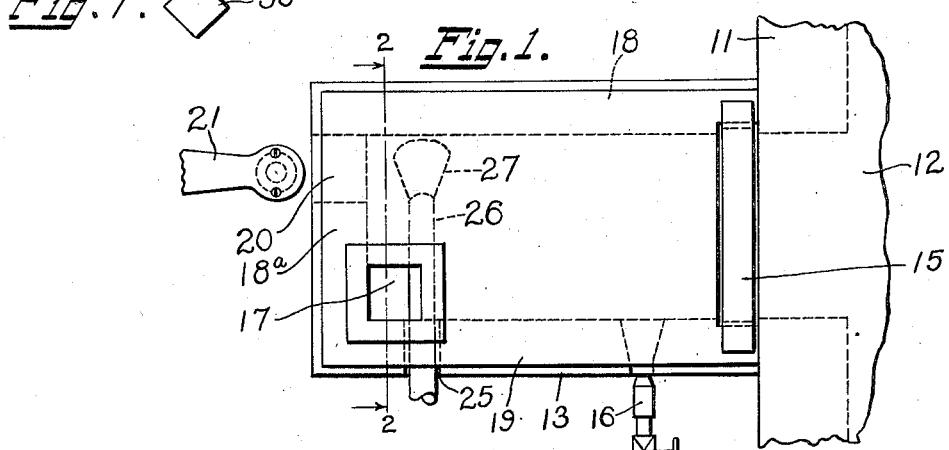
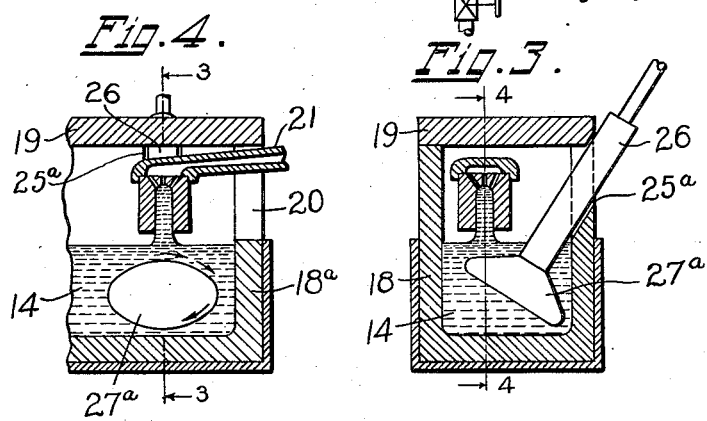
Witness:
Jas. G. White
Inventor
Karl E. Peiler
by Robson D. Brown
Attorney Patented Oct. 20, 1931

1,828,718

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

CONICAL STIRRER

Application filed April 26, 1928. Serial No. 272,956.

This invention relates generally to methods of and apparatus for obtaining mold charges of molten glass and more particularly to the gathering of successive charges or gathers from the surface of a pool of molten glass by means of a suction gathering receptacle which is periodically moved into gathering relation to the surface of the glass at a gathering station and, after a charge or gather has been drawn into the receptacle, is raised to permit severance of the glass in the receptacle from the glass of the pool and is then removed from a position over the pool.

Such gathering receptacle may be provided for transferring the charge or gather to the first shaping mold of a glassware shaping machine, either with or without a certain amount of preliminary shaping of the charge, or it may be a mold of the shaping machine.

As the suction gathering receptacle is at a considerably lower temperature than the molten glass from which it derives its charge, the surface of the glass is chilled each time the gathering receptacle makes contact therewith. Further chilling is also produced by such shearing means as are employed to sever the mold charge from the body of the glass in the pool. The surface of the glass at the gathering station also may be chilled somewhat because of its proximity to the opening which is needed for the entrance of the gathering means. These chilled portions of glass would ordinarily be gathered up by the gathering means in gathering subsequent charges, causing defects or blemishes in the charges and in the ware made therefrom. The chilled glass would interfere with subsequent gathering operations if permitted to accumulate at the gathering station.

An object of this invention is to practically obviate the undesirable features outlined above by causing such circulation or movement of glass of the gathering pool as will prevent the accumulation of chilled glass at the gathering station and will present a fresh supply of hot glass of substantially uniform temperature and condition at the gathering station for each gathering operation.

A further object of the invention is to restore uniformity of temperature and condition of the surface of the glass at the gathering station after each gathering operation by moving the chilled glass away from such surface and into the relatively hot glass of the body of the pool and at the same time moving relatively hot uniformly mixed and homogeneous glass from the body of the pool to the surface of the glass at the gathering station.

Devices for stirring the glass of a gathering pool have been suggested prior to this application, but such prior devices of which I am aware are different in important features of construction and operation from a practical embodiment of the present invention, and lack many of the beneficial features of the present invention. In some of the prior devices, the stirring means passes intermittently through the surface of the glass where the gathering is done, and in itself introduces some of the surface imperfections which it is desired to eliminate. In other prior devices, in order to avoid such defects, the stirring means is located so far from the gathering spot that it loses much of its effectiveness as a stirring device.

The manner in which such difficulties are obviated will be more clearly understood by reference to the accompanying drawings, in which:

Figure 1 is a plan view of the forehearth of a glass melting furnace equipped with a stirring device embodying structural features of the present invention, Fig. 2 is a sectional elevation taken on the line 2—2 of Fig. 1, Fig. 3 is a sectional elevation of a modified form of the invention showing a suction gathering cup in operation, Fig. 4 is a sectional elevation taken on the line 4—4 of Fig. 3, and Figs. 5, 6 and 7 show different cross sectional configurations which may be given to the stirrer of either of the above indicated embodiments of the invention, the views being elevations of the head or working end of the stirrer.

A melting tank 11 is connected through an opening 12 with a forehearth 13. The glass in the forehearth is indicated at 14 and a suitable gate 15 closes the opening above the level of the glass between the tank 11 and the forehearth 13 and depends in the glass far enough to prevent the passage of gases between the furnace and the forehearth. Adjustable burners, as 16, may be provided for reheating the glass in the forehearth and the waste gases from the forehearth pass out through a stack 17 controlled by a damper, not shown. Substantially vertical side walls 18 and an end wall 18a serve to confine the glass from the furnace and cooperate with a top 19 to limit the escape of heat from the forehearth so that the glass therein is maintained at a desirable temperature.

An aperture 20 is provided in one of the walls, preferably one of the vertical walls of the forehearth, to permit the passage therethrough of a suction gathering cup or implement 31. A stirrer or circulator has its shaft 22 journaled in bearings 23, and is driven by suitable means such as the sprocket wheel 24. This rotating member has a stem which passes through an aperture 25 in a side wall of the forehearth above the level of the glass and is inclined to the surface of the glass so that the lower portion or head of the rotating member lies under the surface of the glass. That portion of the rotating member which lies within the forehearth consists of or is inclosed in refractory material 26, and the end portion of this member preferably is an enlarged head 27 of frusto-conical form completely submerged in the glass at a gathering station in the forehearth. The upper surface of the frusto-conical head may be substantially tangent to a horizontal plane and may be parallel to the surface of the glass and relatively close thereto without the head being directly in contact with the surface of the glass at the gathering station. It will be seen from the drawings that the head 27 lies under the spot at which the gathers are taken and that the rotation of the stirrer will tend to rotate the glass around the submerged portion of said stirrer, particularly around the head 27 which at its free end has a relatively large diameter and a relatively great linear velocity, and that such rotation will tend to draw the chilled glass from the surface above the stirrer down into the hotter glass below the surface so that the chilled glass will be reheated to the same temperature and will have the same viscosity and condition as the remainder of the glass in the forehearth. At the same time, homogeneous glass of uniform viscosity, temperature and condition will be moved or drawn from below to the surface of the glass at the gathering station. thus preventing the accumulation of chilled glass and constantly providing a supply of glass of suitable temperature and condition at the gathering station. The stirrer itself does not pass through or directly contact with or act on the chilled glass at the surface of the gathering pool.

It will also be noted that all openings of the forehearth to the air, except the stack 17, are formed through substantially vertical walls thereof and the tendency for heat to be lost through such openings therefore is much less than would be the case were the openings provided in the top of the forehearth. Also, the stem of the stirrer practically prevents escape of heated gases through the opening 25.

Figs. 3 and 4 show the stirrer extending through an opening 25a in a side wall of the forehearth at an angle nearer to the vertical than in the form of the device shown in Figs. 1 and 2, and the enlarged head or frusto-conical portion has its surface 27a made to extend at a greater angle to the axis of the stirrer so that the upper portion of the head is tangent to a horizontal plane parallel to the surface of the glass.

The enlarged head of the improved stirrer or circulator may have a simple circular cross-section as shown for the head 27 in Fig. 5. In order to secure a greater depth of glass at the gathering station for easy flow into the gathering receptacle during the suction operation and yet have the effect of the stirrer or circulator sufficiently strong at the surface to obtain the hereinbefore recited beneficial results, the enlarged head of the stirrer of either of the hereinbefore described forms of the device may be made non-circular in cross-section. For example, depressions 28 may be provided in the head, indicated at 29, (Fig. 6), or the head may be square in cross-section, as indicated at 30 in Fig. 7, or it may be polygonal. In this way gathering may be done with the head in such a position as to give a maximum depth of glass for a gathering operation at the gathering station and the head may be then rotated after such gathering operation and stopped in a proper position for the next gathering operation. It will be seen that the modifications of Figs. 6 and 7 may be considered as having alternate projections for stirring the glass close to the surface and depressions for permitting a maximum depth of glass at the gathering station for the suction gathering operation.

The speed and manner of rotation of the circulator or stirrer may be varied to secure various effects. For instance, the stirrer may be rotated intermittently in timed relation to the gathering operations. The speed of rotation of the stirrer may be varied without stopping this rotation, or the stirrer may be kept rotating continually. It is possible with the improved stirrer to set up a continuous movement of the glass surface at the gathering point so that the surface is constantly being replenished. By more rapid rotation, the glass near the surface may be drawn down to a greater depth so that a greater mixing action may be set up. This tends to make the glass more homogeneous.

In many of the prior devices for stirring molten glass, the device has been located well away from the gathering spot in order not to interfere with the operation of the gatherer itself. But by placing the stirrer under the surface, it is possible to bring it relatively close to the spot where the gathering is done. Also certain prior devices pass through the surface of the glass in an intermittent manner, sometimes through the surface of the glass at the gathering station. There is a tendency in such devices for the stirrer itself to cause irregularities at the surface of the glass, but in the present device, there is no dipping into or out of the surface and there is no contact with the surface at all, except at a distance from the gathering spot.

The stirrer of this invention may be used with various forms of gatherers or suction receptacles or molds, and the opening for the introduction of the gatherer may be varied according to different conditions of service. It is also obvious that various forms of severing means may be used as may be most suitable for use with the particular type of gatherer employed.

It will be understood that the above embodiments of the invention are for the purpose of illustration only and various modifications may be made therein without departing from the spirit and scope of the invention, as defined in the appended claims.

A specific adaptation of this invention is shown and claimed in combination with cooperative features in the copending joint application of the present applicant and William T. Barker, Jr., filed September 9, 1927, Serial No. 218,398. The present application is a continuation in part of the aforesaid prior application, Serial No. 218,398, and is intended to claim the invention generically in terms sufficiently broad to include both the former specific embodiment as well as the present embodiments of the invention.

I claim:

1. The method of obtaining unchilled gathers of homogeneous glass from a gathering pool from which successive gathers are taken from the surface of the glass, which method comprises stirring the glass beneath the gathering spot in such manner as to draw under the surface the chilled surface portion at the gathering spot after a gathering operation.

2. The method of circulating glass at a gathering station at the surface of a supply body of molten glass, comprising drawing downwardly into the supply body the glass remaining at said gathering station after a gathering operation and simultaneously replacing the glass so withdrawn by a fresh supply of glass from beneath the surface of the supply body.

3. The method of circulating glass at a gathering station at the surface of a supply body of molten glass, comprising drawing downwardly into the supply body the glass remaining at the gathering station after a gathering operation and simultaneously replacing the glass so withdrawn by a supply of glass from another portion of said supply body.

4. The method of supplying molten glass which comprises, maintaining a pool of glass, successively gathering charges of glass from the surface of the pool in a gathering zone, and drawing the glass in the gathering zone downwardly through the pool to remove the chilled portions of glass produced by the gathering operation from the gathering zone.

5. The method of circulating molten glass in a pool thereof from the surface of which charges of glass are successively gathered in a gathering zone which comprises projecting a rigid implement into the glass beneath said zone, maintaining the implement in adhesive contact with the glass, and rotating the implement to move upper layers of the glass in one direction and lower layers of the glass in an opposite direction.

6. The method of circulating molten glass in a gathering pool from the surface of which charges of glass are successively gathered in a gathering zone, which comprises projecting a rigid implement into the glass beneath said gathering zone, maintaining the implement in adhesive contact with the glass beneath said zone, and rotating the implement to move upper layers of the glass in one direction and lower layers of the glass in an opposite direction in a path confined within the gathering pool.

Signed at Hartford, Conn., this 21st day of April, 1928.

KARL E. PEILER.